April 26, 1938. P. W. NEFF 2,115,117
TRANSMISSION
Filed June 27, 1935 2 Sheets-Sheet 1

INVENTOR
Paul W. Neff
BY Wood & Wood
ATTORNEYS

April 26, 1938.                P. W. NEFF                2,115,117
                              TRANSMISSION
                          Filed June 27, 1935        2 Sheets-Sheet 2

INVENTOR
Paul W. Neff
BY
Wood & Wood
ATTORNEYS

Patented Apr. 26, 1938

2,115,117

UNITED STATES PATENT OFFICE 2,115,117

TRANSMISSION

Paul W. Neff, Pittsburgh, Pa.

Application June 27, 1935, Serial No. 28,706

11 Claims. (Cl. 192—.01)

This invention relates to transmissions, and is particularly directed to improvements in and control of speed change apparatus. The improvements are generally in the direction of speed change by power means under semi-automatic control, and are preferably adapted to the transmission of an automobile. Accordingly, the prior patent to Paul Neff, No. 1,687,139, issued October 9, 1928, may be referred to.

It is a recognized fact that the primary requisite to successful automatic gear shifting by power is that the elements to be shifted for the purpose of changing speed be in proper position or rotating at the proper speeds for gear coupling without clashing, and that they be positively, quickly, and efficiently engaged. It is therefore the object of the present invention to provide an improved speed change transmission including a power shift therefor in which the shifts are made under ideal conditions, uninfluenced by the speed of the motor, speed of the automobile, or combinations of these speeds. To this end the present invention constitutes the provision of means for entirely and automatically disconnecting both the motor and propeller shaft from the transmission parts for the purpose of each gear shift. It further contemplates the arrangement of the transmission parts, themselves, in such manner as to cause coordinated movement of these parts which is highly conducive to quiet and positive gear coupling. It further contemplates the arrangement of transmission parts, whereby a shift can be made from a high speed to a low speed without necessitating lowering of car speed to approximate that of motor speed. This is provided by the inclusion of means for rendering the speed change transmission parts entirely independent of the power and driven parts, wherein the inertia of these parts may be regarded as unitary and wherein the respective, rotatively coupled parts, themselves, are related in weight to approach the same speeds very quickly so that the coupling of rotating parts may be accomplished without clashing or blocking.

It is a further provision in the present construction that, after long coasts under freewheeling condition, the recoupling of the power is smooth and entirely without jerk or strain on the transmitting parts, and by step by step coupling.

As an adjunct to the power shift, an improved semi-automatic gear selecting and shifting apparatus is provided. It is therefore a further object of the invention to provide this control and shifting apparatus which is of simplified design, compact and efficient and containing means rendering it impossible to change gears unless the power is unclutched and gears returned to neutral.

Other objects and further advantages will be more fully apparent from a description of the accompanying drawings, in which:

Figure 2 is a horizontal sectional view taken on line 2—2, Fig. 1, showing the details within the transmission casing.

Figure 3 is an enlarged side view of a portion of Figure 1, showing the relation of certain internal parts in dotted lines.

Figure 1:
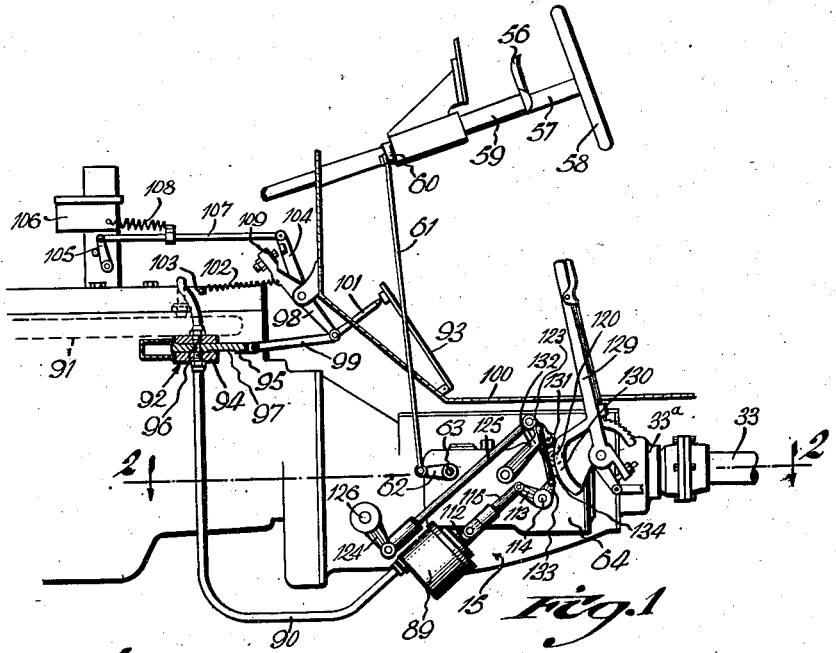
Figure 1 is a general view, showing the intermediate portion of a motor car, particularly a part of the motor, the transmission, and the steering post, for illustrating the complete control system for the improved, semi-automatic, power shifted speed change apparatus of this invention.
Figure 4:
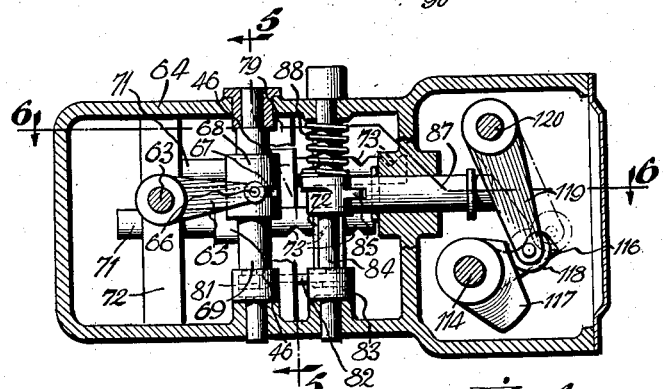
Figure 4 is a sectional view taken on line 4—4, Fig. 2, detailing the gear selecting and shifting apparatus.

In this adaptation of the invention, it is illustrated as incorporated in a speed change gear transmission for an automobile. This transmission is mounted or encased in a transmission box or casing which is extended back from the motor of the automobile and includes a clutch or fly-wheel compartment and a gear compartment. It will be understood that any type of clutch can be operated by means of the apparatus of the present improvement in conjunction with the gear shifting mechanism. The clutch illustrated includes a member slidable inwardly for disengagement of the clutch members for disconnecting the motor from the transmission. The clutch mechanism may be contained within the fly-wheel of the motor car in the conventional manner. For the reason that it is well understood it is not disclosed herein.

The gear box contains the customary arrangement of gears providing for three forward speeds and a reverse. The gearing illustrated is of the constant mesh type, there being four sets of constantly meshing gears for accomplishing the forward and reverse speeds above mentioned. The operation of the shifting mechanism by power is accomplished by means of a vacuum operated clutch actuating and gear shifting device which operates the clutch and shifts the selected gears in the proper sequence. The prior patent to Neff discloses a somewhat similar device, although not specifically shown and described as operated by vacuum.

Referring specifically to the drawings, the transmission casing is indicated at 15. The casing incorporates an intermediate wall 16 dividing the casing into a clutch compartment 17 and a gear compartment 18. The shafting 19 for conveying the motive power to the wheels of the car is extended through the transmission casing to the rear thereof from the fly-wheel and clutch assembly 20. This shaft is located longitudinally of and approximately centrally of the transmission case.

One gear of each set of constantly meshing gears, namely, gears 21, 22, 23, and 24, is mounted on the axis of this shafting. Other gears of the sets, namely, gears 25, 26, 27, and 28, are fixed on a countershaft 29. In the case of the reverse speed set, namely 23 and 27, a reversing gear 30 is interposed between the gears 23 and 27. The construction for reverse is well understood and for that reason is not fully illustrated herein.

There are three main sections or shaft elements incorporated in the shafting heretofore mentioned; the motor shaft or power shaft 31, the intermediate or transmission shaft section 32, and the propeller shaft 33. These three shaft sections are all in axial alignment and are supported and located in the following manner.

No description is necessary as to the support of the crank shaft and fly-wheel of the engine since it is conventional. A clutch controlled, rear section or extension 34 of the power shaft is supported between the fly-wheel and the wall 16 separating the transmission casing in suitable ball bearings 35. The propeller shaft 33 is supported at its forward end in the rear wall 33ª of the transmission casing in ball bearings 36, its rear end being supported at the rear of the car in the usual manner.

The intermediate or transmission shaft 32, contained entirely within the transmission, has its forward end piloted or journalled in roller bearings 37 in an axial bore of the clutch controlled, power shaft extension, and its rear end supported in the same manner in the propeller shaft 33. Thrust balls 38, incorporated in the sockets or end bores of the clutch controlled power shaft extension, and the propeller shaft engage the piloted ends of the gear bearing shaft and take end thrusts.

The countershaft 29 is suitably journalled in the separating wall and the end wall of the casing and includes the four integrally formed gears 25, 26, 27, and 28. Three of these gears are devoted to forward speeds; namely, large gear 25, intermediate gear 26, and small gear 28.

The component gears 21, 22, 23, and 24, mounted on the transmission shaft, are arranged as follows: The clutch controlled power shaft, rear section or extension 34 incorporates the gear 21 formed integrally therewith and disposed on the inside of the transmission casing against the inner race of the inner, ball bearing 35. This inner gear 21 formed as a part of the clutch controlled power shaft extension is in constant mesh with the large gear 25 on the counter-shaft, and is effective as a part of the transmission in all forward speeds and reverse.

The three other gears, 22, 23, and 24, which are mounted on the axis of the shafting generally mentioned, are each in mesh with a particular or component gear of the countershaft. Each of these three last gears is loosely mounted on the intermediate shaft section 32. The sets of component gears are controlled in pairs. The low speed and reverse gears 24 and 23 have adjacently extended clutch toothed hubs 39, and the forward two, that is, the main driving gear 21 on the clutch controlled power shaft extension, and the intermediate gear 22 include adjacently disposed clutch toothed hubs 40.

Abutment rings 41 are secured in annular grooves in the transmission shaft lying against the respective sides of the gears and preventing endwise displacement thereof. The intermediate and reverse speed gears 22 and 23 are spaced by means of a spacer washer 42 which is loosely mounted therebetween.

The intermediate transmission shaft 32 is splined throughout its length with the exception of its counterturned piloted or support portions. Clutch blocks 43 are in splined connection with said shaft, one between the gears of each pair. These clutch blocks are toothed in the same manner as the hubs of the gears. Longitudinally shiftable clutch elements 44 are mounted in toothed connection with the clutch blocks. These clutch toothed elements may be moved axially on their splined or toothed connections on the clutch blocks into the same relation on the clutch toothed gear hubs. The hubs are short and the longitudinal movement of the clutch elements is limited so that the clutch elements when moved fully endwise are still in splined engagement with both the particular hub and the particular clutch block.

Each of these clutch elements 44 includes an annular groove 45 engaged by a shifting yoke 46 extended from the speed control mechanism.

Between the intermediate transmission shaft and the propeller shaft, a clutch 47 of the following construction is incorporated. The forward end of the propeller shaft includes a plate 48 formed thereon within the transmission casing. A cylindrical clutch element 49 having a tapered, internal bore is secured to the outer margin of the plate, and is disposed concentrically of the transmission shaft. A cylindrical clutch element 50 including a hub 51 is in splined connection with the transmission shaft. This latter element includes a tapered outer surface, the taper of which corresponds to the taper of the propeller element, thus providing a cone type clutch.

A flat coil spring 52, under compression, is disposed between the end of the propeller shaft about the transmission shaft and against an end thrust ball bearing 53, abutting the inner clutch element. A clutch operating or throw-out yoke 54 engages the forward face of the inner clutch element 50 through an end thrust ball bearing 55. The clutch element 50 is therefore free to rotate between the spring and shifter yoke. The spring keeps the inner cone element in frictional contact with the outer element and maintains the coupling. The yoke by rearward shifting of the inner cone element disconnects the clutch.

Referring to Figure 1, a selector finger 56 for gear shifting is mounted on the steering post 57 just below the wheel 58. The finger 56 is affixed to a shaft 59. The lower end of the shaft has an arm 60, fixed thereon, which is flexibly connected to a rod 61. This same type of flexible connection is provided at the lower end of the rod for attachment to the outer end of an arm 62 fixed on the outwardly extended end of a stub shaft 63 mounted in the end closure wall of a side compartment 64 of the transmission casing 15.

Figure 5:
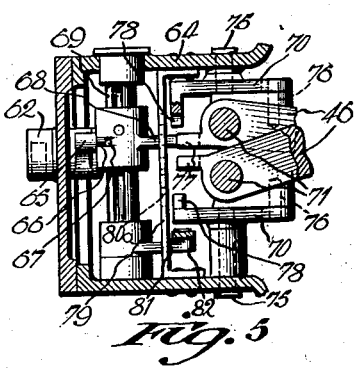
Figure 5 is a sectional view taken on line 5—5, Fig. 4.
Figure 6:
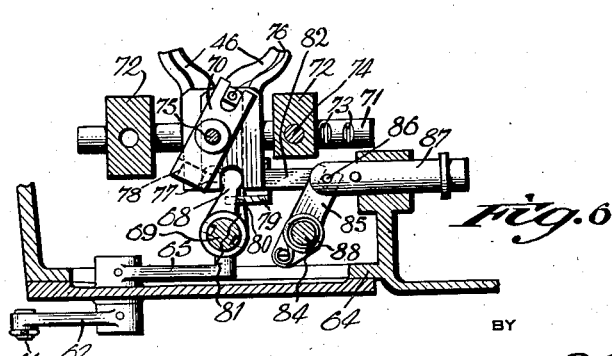
Figure 6 is a sectional view taken on line 6—6, Fig. 4.

The inner end of the stub shaft also carries an arm 65. The outer end of the arm 65 includes a pin 66 projected into a transverse slot 67 in the hub of the shifter finger 68 of the selector mechanism. This shifter finger 68 is slidably mounted in splined connection on a rock shaft 69 which is suitably connected to the power operated medium. The shifter finger 68 is slidable to four positions as determined by setting of the selector finger within the transmission box, best shown in Figure 5, which is movable to any one of the four speed positions. The shifter finger 68 is adapted to engage and cooperate with the extensions on any one of four gear shifting levers. Two of these shifting levers are the shifter yokes 46, 46, themselves, and the other two are motion reversing levers 70, 70, effective on the shifter yokes.

The shifter yokes are fixed to slide rods 71, 71, respectively, slidably journalled in lugs 72 of the frame. Each shifter yoke has three positions, namely, the two gear coupling positions, heretofore described, and an intermediate or neutral position. Therefore each rod is provided with three detent grooves 73 engaged by a detent 74 in a particular lug 72 of the casing. The reversing levers 70, 70, are fulcrumed intermediate their ends on pivot studs 75 and have their ends opposite to those engaged by those of the shifter finger rotatively engaged on studs 76 fixed in the shifter yokes. These actuating studs 76 therefore are on the opposite side of the shifter rods from the shifter finger.

Now each yoke includes a bifurcated extension 77 projected directly toward the shifter finger support or rock shaft 69. The reversing links or fulcrumed levers 70, 70, include angularly projected extensions 78, 78, having bifurcations in the same general path of movement with the bifurcations of the shifter yokes. Therefore the shifter finger will engage any of these bifurcated extensions as determined by the position of the selector finger or lever on the steering post.

Rotation of the rock shaft will cause endwise shifting of a particular gear shifting yoke 46 in one direction when engaged directly with the yoke and a reverse direction when engaged with a motion reversing, fulcrumed lever 70.

A lock bar 79, for preventing operation of the selector mechanism when the clutches and gears are in, is provided. This bar is extended across the casing for the selector mechanism, and in and along the path of swinging movement of the selector finger. A slot 80 is provided in this lock bar adjacent each bifurcation. Therefore as the rock shaft is rocked to shift the yokes, the shifter finger engages a particular one of the slots and longitudinal movement of the shifter finger is impossible so that the selector lever on the steering post is locked in position.

The shifting rotation of the finger is brought about by means of an arm 81 fixed on rock shaft 69 and connected, by means of a link 82, to another arm 83 fixed on a second rock shaft 84. This second rock shaft also carries another arm 85 which has a bifurcated end engaging a pin 86 in the bifurcated inner end of a shifting plunger 87.

A heavy gear shifting spring 88 of coil form is disposed under wound tension about the second rock shaft 84 having one end or terminal anchored to the casing and the other end or terminal anchored to the hub of the arm 85 which is connected to the plunger 87.

The plunger is contacted by the power operated apparatus operating the clutches in conjunction with the gear shifting. Accordingly, at this point the power apparatus will be described. Again referring to Figure 1, it will be observed that a vacuum cylinder 89 is fixed to the side of the transmission casing. A conduit 90 extends from the intake manifold 91 of the motor to this cylinder. A valve 92 is incorporated in this conduit for the purpose of controlling operation of the vacuum device. This valve is actuated by means of the accelerator 93 of the motor car. It incorporates a body 94 and a slide valve element 95. The slide valve element includes a diametric passage 96 and a longitudinal exhaust groove 97 apart from the passageway.

The outer end of the valve element 95 is connected to a fulcrumed lever 98 by means of a link 99. The fulcrumed lever is a part of the throttle mechanism for the motor. The accelerator pedal 93 is pivoted at its lower end on the floor board 100 of the car and has its swinging end in contact with a pin 101 extended through the floor board and flexibly connected to the same end of the lever 98 as the link 99. A spring 102, under tension between a bracket 103 on the motor and the outer end of the lever, maintains the lever in retracted position when the motor is idling.

An arm 104 is pivoted on the fulcrum of the lever 98 and is connected to the arm 105, controlling the gasoline feed of the carburetor 106 by means of a link 107. A spring 108 urges the arm 104 toward closing position of the carburetor valve in the conventional manner. A contact screw 109 is adjustably mounted in the end of the fulcrumed lever 98 and is adapted for contact with the arm 104.

As illustrated in Figure 1, the valve 92 controlling the clutch and gear shift device is in open position with the opening in the valve element connecting the respective sections of the conduit 90. In this position the accelerator is fully released and the motor is idling with the suction of the intake effective for maintaining the clutch actuating and gear shifting device in its neutral position permitting setting of the selecting mechanism in a particular shift position.

Depression of the accelerator in its first phase does not affect the speed of the motor, that is, does not change the relation of the gasoline control because of the fact that there is clearance between the contact screw 109 and the arm 104. This clearance is sufficient for permitting registration of the exhaust groove 97 with the suction line.

The piston 110 in the vacuum cylinder is engaged by a coil spring 111 under compression. The suction operated piston 110 has its rod 112 connected to an arm 113 of a cam shaft 114 by means of a flexible link 115. The cam shaft 114 is journalled horizontally in the side of the transmission casing. The coiled compression spring 111 in the cylinder normally maintains the piston away from the suction end of the cylinder and aids the gear changing outward movement of the piston under spring pressure as will be hereinafter described.

The cam shaft (see Figures 2 and 3) carries two cams, namely, 116, 117, the first of which operates the plunger of the gear shifting mechanism for moving it to neutral or gear pick-up position, and the second of which controls the clutches.

The clutch controlling cam 117 engages a roller 118 on the end of an arm 119, fixed to a stub shaft 120 journalled in the wall 121, and a lug 122 of the casing. The extreme inner end of this shaft 120 has the clutch throw-out yoke 54 for the rear clutch 47 fixed thereto, so that rotation of the shaft 120, as induced by operation of the vacuum operated, power unit, causes disconnection of the clutch.

Another arm 123 is fixed to the external end of the stub shaft 120 and is connected to another arm 124 by means of a link 125. The latter arm 124 is fixed on a main clutch controlling shaft 126. A clutch shifting yoke element 127 is fixed to the latter shaft 126 in engagement with the clutch element 128 about the clutch controlled power shaft extension.

The first mentioned cam 116 is active against the outer end of the selector plunger or slide rod heretofore described.

As shown in the general view, it has been provided that the hand brake lever 129 is effective for disengaging the clutches and returning the gear coupling element to neutral. This is done by means of a cam portion 130 on the brake lever 129 engaging a roller 131 mounted on the end of an arm 132 which is pivoted on the side of the transmission casing. The outer end of this arm is connected to an arm 133 fixed on the cam shaft 114, the connection being in the form of a link 134.

The arrangement of parts shown in Figure 1 is the same as that shown in my co-pending application Serial No. 707,346, filed January 19, 1934, the present invention being concerned with improvements in the improved arrangement of the transmission, incorporation of a clutch between the transmission and the propeller shaft controlled by the same power unit as the main clutch, and another form of apparatus for selecting and shifting the gears.

The operation of the complete apparatus is as follows. For a clear understanding, reference may first be had to Figure 1. This view shows the apparatus in position where the gears are in neutral and the power is disconnected. With the hand brake 129 set, the mechanism has been manually positioned whereby the clutches are disconnected and the gears are in neutral. When the motor is started, the vacuum created at the intake manifold is effective through the conduit 90 for moving the parts to the position shown in Figure 1, that is, uncoupled position, or for maintaining the parts in this position if the hand brake be released. The vacuum is immediately effective since the normal position of rest of the valve 92, with the accelerator 93 fully released, maintains the conduit sections in communication.

After starting the motor, the operator selects the forward speed or the reverse, whichever it may be, by means of the selector finger 56 on the steering post. This places the shifter finger 68, which is inside the transmission casing, in engagement with the particular one of the yokes or yoke movement reversing levers. The first phase of accelerator movement preceding actual speeding up of the motor is effective for moving the valve to vacuum relief position.

Promptly upon relief of the vacuum device, the heavy coil spring 88, associated with the selector and shifter mechanism, is effective for moving the particular yoke through the medium of the shaft 84, arm 83, link 82, arm 81, shaft 69, selector arm 68, yoke 46 or yoke movement reversing link 70, and clutch element 44 to the appropriate gear. The spring may be effective for the reason that the cam normally holding the plunger or shifter rod at neutral position is retracted by exhaust 75 of the vacuum device.

It is therefore seen that the accelerator sets in action the power or force tending to throw in the clutches and shift the appropriate gear. The two clutches are operated or connected by the same spring-urged return movement of the power operated cams. At this point it may be noted that the return of these parts is not only induced by the coil spring 88 which accomplishes the actual gear shifting, but also by the coil spring 111 engaging the piston in the power cylinder. Also, as the cams move back, the shift is performed in advance of the clutch connection as will be evident from the arrangement of the cams.

The yoke 54 operating the rear clutch is fixed to its shaft 120 in the proper relation for causing engagement of this clutch ahead of the main clutch. Upon further depression of the accelerator the motor is speeded up in the usual manner and the car is in motion. Change to another speed is easily accomplished. Full release of the accelerator slows down the motor, throws out the clutches, and sets up the gear shifting mechanism, that is, places it in neutral, thus uncoupling the car from the particular gear in which it has been driven. The procedure, described heretofore, is again followed.

Each time the accelerator is released, the countershaft, the gears, and the gear bearing transmission shaft are entirely disconnected, both from the motor and the propeller shaft. As explained, this is done through power operation automatically as the valve permits vacuum action in the vacuum device and appropriate movement of the power parts. All the parts of the transmission being entirely disconnected, they are free to rotate under what may be called unitary inertia. In other words, all these parts are either rotating or at rest so that operation of the gear coupling clutches associated with each set of gears can take place efficiently without clashing. This freedom from back rotation or entire disconnection of transmission parts from driving influence of any sort makes it possible to perform the shifts by power and automatically.

In an automatic gear shift, there can be no easing in of the clutch or gears, but these parts must move in with mechanical precision. After the car is in motion, the rapid rotation of the propeller shaft relative to the reduced speed of the power shaft when the accelerator is released, if it were permitted to act upon the transmission parts by direct connection, would render it impossible to shift to a lower speed unless car movement were greatly reduced so as to bring the propeller shaft speed down to a rate corresponding to that of the power shaft.

By the present improvement through the use of the double clutch arrangement operated through the same automatic power means, the transmission parts are not under the influence of either the motor or the propeller shaft at the time of shift. All of the transmission parts come to rest fairly soon after the clutches are disconnected because of the grease in the transmission case. Since the gear bearing transmission shaft is not heavy and does not have heavy rotating parts fixed thereto, its inertia is reduced. Because of the independence of the transmission shaft and the reduction in inertia, the clutch elements splined on it have less inertia; therefore, there is less jolt or clash when these clutch elements are shifted into gears moving at different speeds.

For the long coast, as when the accelerator is fully released, the disconnection of the clutches establishes a free-wheeling condition, the advantages of which are well known. If the coast is long enough, the transmission parts, that is, the parts between the clutches, will come to rest, and the gear is again connected ahead of the coupling of the clutches without clashing. The coupling of gears occurs under spring pressure so that the meshing action is cushioned. In the event that clutch teeth on the gears and coupling elements are used which permit end to end engagement, the shift will only be delayed until the clutches begin to connect the drive, at which time the end to end condition of the teeth will be changed and the coupling elements can complete their stroke under the spring action. This is particularly advantageous when the transmission parts are all at rest when the shaft is initiated.

The improvements constituting the present invention thus may take form in the transmission of an automobile for the purpose of achieving in the main a smoothly and efficiently operated speed change mechanism.

To this end the transmission parts themselves have been arranged toward a more efficient coupling of the power shaft to the propeller shaft in any of the different speeds. Back rotation of the transmission shaft and countershaft as induced by the movement of the car, or more specifically, the propeller shaft, is eliminated. The transmission shafts in the speed change apparatus have been constituted as entirely separate shafts adapted for coupling to the motor or power shaft and the propeller shaft by separate clutches.

By couplings at either end of the transmission, all the shafts of the transmission and the parts therein may thus be freed of the influence of the motor shaft and the propeller shaft when shifting is being performed. The unitary inertia or coast of the gear bearing shafts and the gears, or coupling devices if gears are not used, within the transmission speed change box permits easy and noiseless shifting. This result is, of course, particularly valuable in semi-automatic power shifting since the shifts naturally are instituted and must take place without regard to conditions. A constantly meshing gear transmission using clutches for coupling the gears to the shafts has been selected as the most adaptable environment for the improvement.

The rear and forward clutches are power operated in the named sequence following the gear shift, the operation occurring through the same power means. Operation of the clutches in the named sequence couples the stationary parts when the car is stationary, namely, the propeller shaft and transmission shaft prior to the coupling of the moving motor shaft and the transmission shaft.

When the car is in motion and the motor is decelerated, both clutches are disconnected and the car is in position for free-wheeling, not only the motor but the transmission parts as well being disconnected. As heretofore stated, if the coast is long enough, the transmission parts come to rest. When the motor is again speeded up, the rear clutch connects, first, coupling the transmission parts to the moving propeller shaft and, immediately following, the motor shaft is coupled to the transmission parts which are gathering speed, thus taking a great deal of the sudden load off the main clutch. This sudden load would otherwise occur in cases where the motor speed and car speed were not at the proper rate to cause the propeller shaft and motor shaft to be rotated at the same speed. It is emphasized that in a semi-automatic power shifted transmission, the clutch cannot be eased in or manipulated as in the case of foot operation, but must go in at a definite time. Accordingly, relative speeds are important in the coupling of the parts.

The control or gear selection unit herein disclosed is designed primarily with reduction of parts, without loss of efficiency, in mind.

Having described my invention, I claim:

1. In a transmission, a clutch controlled power shaft, a clutch therefor, a propeller shaft, an intermediate loosely rotatably supported transmission shaft, a clutch for connecting the transmission shaft and the propeller shaft, a fluid operated device coupled to said clutches for engaging said clutches in the order named, a countershaft in constant driving connection with the power shaft, component gears mounted on the transmission shaft and countershaft respectively, and coupling devices for selectively connecting the gears to the transmission shaft.

2. In a transmission, a clutch controlled power shaft, a clutch therefor, a propeller shaft, an intermediate transmission shaft extended loosely rotatably between the power shaft and the propeller shaft, a clutch for connecting the transmission shaft and the propeller shaft, a fluid operated device coupled to said clutches for engaging said clutches in the order named and speed change gears interposed between the power shaft and the transmission shaft and adapted to be selectively coupled to the transmission shaft.

3. In a transmission, a clutch controlled power shaft, a clutch therefor, a propeller shaft, an intermediate transmission shaft loosely mounted in and extended between the power shaft and the propeller shaft, a clutch for connecting the transmission shaft and the propeller shaft, speed change gears interposed between the power shaft and the transmission shaft and adapted to be selectively coupled to the transmission shaft, and common means for controlling the respective clutches.

4. In a transmission, a clutch controlled power shaft, a clutch therefor, a propeller shaft, a transmission shaft between the power shaft and the propeller shaft, a clutch for connecting the transmission shaft and the propeller shaft, speed change gearing between the power shaft and the transmission shaft, coupler devices for selectively connecting the gearing to the transmission shaft, and a common means for operating the clutches and the coupling devices, said means operating the gear coupling device first, the clutch between the transmission shaft and the propeller shaft second, and the clutch in the power shaft last.

5. In a transmission, a sectional shaft, the intermediate section of which is loosely rotatably mounted between the adjacent sections, a clutch for coupling the intermediate section to the rearmost section, a transmission including speed change gears between the first section and the transmission section, a clutch for controlling the drive to the first section, means for selectively shifting the speed change gears, a vacuum device for operating the gear couplers, rear clutch and power shaft clutch, an internal combustion engine for driving the sectional shaft, a speed control throttle for the power means, a control device for the gear and clutch shifting vacuum device, and a connection between the control throttle and the control device for causing operation of the vacuum device when the speed of the power means is reduced for disconnecting the clutches and the particular gear, whereby the intermediate shaft section is entirely uncoupled from the other sections.

6. In a transmission, a clutch controlled power shaft, a clutch therefor, a propeller shaft, an intermediate transmission shaft extended between the power shaft and the propeller shaft, a clutch for connecting the transmission shaft and the propeller shaft, speed change gears interposed between the power shaft and the transmission shaft and adapted to be selectively coupled to the transmission shaft, coupler devices for connecting said gears selectively to the transmission shaft, and a common control means for operating said clutches effective for connecting the second named clutch ahead of the first named clutch.

7. In a transmission, a sectional shaft, the intermediate section of which is loosely rotatably mounted between the adjacent sections, a clutch for coupling the intermediate section to the rearmost section, a transmission including speed change gears between the first section and the transmission section, a clutch for controlling the drive to the first section, means for selectively shifting the gears for coupling the same to the intermediate section, a power actuated device for operating the gear couplers, rear clutch and power shaft clutch in the named sequence, a driving means for the sectional shaft, a speed control throttle for the driving means, a control device for the power operated gear and clutch shifting device, and a connection between the speed control throttle and the control device for causing operation of the power actuated device when the speed of the driving means is reduced, for disconnecting the clutches and the particular gear, whereby the intermediate shaft section is entirely uncoupled from the other sections.

8. In a transmission, a clutch controlled power shaft, a clutch therefor, a propeller shaft, a transmission shaft loosely rotatably mounted between the power shaft and the propeller shaft, a clutch for connecting the transmission shaft and the propeller shaft, speed change gearing between the power shaft and the transmission shaft, coupler devices for selectively connecting the gearing to the transmission shaft, and control means for operating the clutches and the coupling devices, said means operating the particular gear coupling device first, the clutch between the transmission shaft and the propeller shaft second, and the clutch in the power shaft last.

9. In a transmission, a power transmitting shaft, comprising, coaxially mounted sections, the first of which sections is an engine shaft, the second of which sections is an extension of the first and incorporates a driving gear, the third of which sections is a gear and coupler supporting intermediate transmission shaft, and lastly the fourth of which sections is a propeller shaft, gears loosely mounted on said intermediate transmission shaft, a countershaft carrying gears in mesh with the gears of the intermediate transmission shaft and a gear in mesh with the gear of the extension shaft, a clutch for connecting the motor shaft section to the extension section, a clutch for connecting the gear and coupler bearing shaft section to the propeller shaft section, and a fluid actuated device coupled in fixed relation to said clutches for engaging said clutches in the order named.

10. In a transmission, a clutch controlled power shaft, a clutch therefor, a countershaft in fixed driving connection with said clutch controlled power shaft, speed change gears fixed on said countershaft, a propeller shaft, an intermediate shaft journalled coaxially in and between said power shaft and said propeller shaft, speed change gears loosely mounted on said intermediate shaft component to and in mesh with said countershaft gears, gear coupler devices for selectively connecting any one of said loosely mounted gears to said intermediate shaft or said power shaft directly to said intermediate shaft, a clutch for connecting said intermediate shaft to said propeller shaft, and a common means for operating said clutches to couple the drive through said intermediate shaft or to entirely uncouple said intermediate shaft from the power and propeller shafts.

11. In a transmission power means, a clutch controlled power shaft, a clutch therefor, a propeller shaft, a speed change transmission between said power shaft and said propeller shaft including a plurality of shifter means and a selector means therefor, a clutch for connecting said transmission to said propeller shaft, an accelerator for said power means, and a power actuated device controlled by said accelerator for uncoupling and coupling said clutches, and intermediately of said uncoupling and coupling moving a selected shifter means for a predetermined gear shift.

PAUL W. NEFF.